United States Patent [19]

Takahashi et al.

[11] Patent Number: 4,586,475
[45] Date of Patent: May 6, 1986

[54] IGNITION TIMING CONTROL APPARATUS FOR INTERNAL COMBUSTION ENGINE

[75] Inventors: Akira Takahashi; Yoshiaki Danno; Kazumasa Iida, all of Kyoto; Toshio Iwata, Himeji, all of Japan

[73] Assignees: Mitsubishi Jidosha Kogyo Kaisha; Mitsubishi Denki Kabushiki Kaisha, both of Tokyo, Japan

[21] Appl. No.: 675,218

[22] Filed: Nov. 27, 1984

[30] Foreign Application Priority Data

Nov. 29, 1983 [JP] Japan ................. 58-244660

[51] Int. Cl.$^4$ ............................................. F02P 5/15
[52] U.S. Cl. .................................... 123/425; 123/416
[58] Field of Search ............... 123/406, 415, 416, 417, 123/425, 435, 575

[56] References Cited

U.S. PATENT DOCUMENTS

| | | | |
|---|---|---|---|
| 3,822,583 | 7/1974 | Keller et al. | 73/35 |
| 4,243,007 | 1/1981 | Ehrhardt et al. | 123/419 |
| 4,463,565 | 8/1984 | Rydquist et al. | 123/425 X |

FOREIGN PATENT DOCUMENTS

| | | | |
|---|---|---|---|
| 27886 | 2/1983 | Japan | 123/425 |
| 143169 | 8/1983 | Japan | 123/425 |
| 138262 | 8/1983 | Japan | 123/416 |

Primary Examiner—Tony M. Argenbright
Attorney, Agent, or Firm—Leydig, Voit & Mayer

[57] ABSTRACT

An ignition timing control apparatus for an internal combustion engine capable of using as a fuel a regular (low-octane) gasoline, a premium (high-octane) gasoline, or a mixture of both type of gasolines. The engine produces knocks when the ignition timing is advanced beyond a reference ignition timing determined as a function of the type of gasoline being used. This ignition timing control apparatus detects the knocks, and provides as an output therefrom a signal according to the occurrence rate of the knocks which essentially indicates the type of gasoline in use. By means of this signal, this ignition timing control apparatus continuously displaces the reference ignition timing in the direction of retard angle by using a proportion factor calculator and an interpolator. At the same time, the displaced reference ignition timing is corrected by the detected knock signals on a real time basis. The combined ignition timing signal serves to energize an ignition coil to suppress the occurrence of knocks. This operation will continue until no knocks occur. Particularly, when the engine is outside of a predetermined operation region or condition, the displacement magnitude for the reference ignition timing is retained at a value of a normal operating state irrespective of whether or not knocks are detected.

12 Claims, 36 Drawing Figures

IGNITION TIMING CONTROL APPARATUS FOR INTERNAL COMBUSTION ENGINE

BACKGROUND OF THE INVENTION

This invention relates to an ignition timing control apparatus for an internal combustion engine, and in particular to an ignition timing control apparatus for an internal combustion engine which is operable either with a low-octane rating fuel or a high-octane rating fuel.

It is well known in the art that the octane rating of fuel gasoline is greatly interrelated with a knock-resistibility in an internal combustion engine. Namely, as the octane rating of gasoline becomes higher, the knocking of an engine correspondingly decreases.

Figure 1:
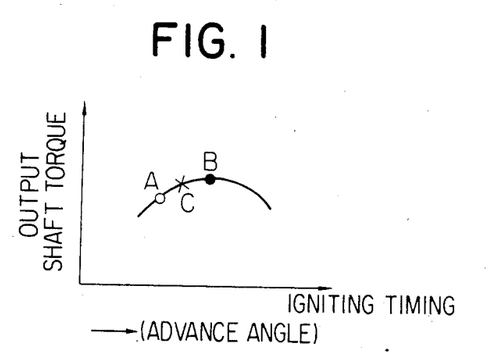
FIG. 1 shows an output shaft torque characteristic of an internal combustion engine as a function of ignition timing.

FIG. 1 shows an ignition timing vs output shaft torque characteristic in an internal combustion engine in the case where a commercially available low-octane gasoline (regular gasoline) and a commercially available high octane gasoline (premium gasoline) of which the octane rating is higher than that of the low-octane gasoline. In the figure, point A indicates a knock limit for the low-octane gasoline while point B indicates a knock limit for the high-octane gasoline, in which knock arises when the angle of the ignition timing is advanced beyond these points. According to FIG. 1, it is possible to advance the angle of the ignition timing up to a point B if the high-octane gasoline is used, where the output shaft torque will be higher as compared with the use of the low-octane gasoline.

Figure 2:
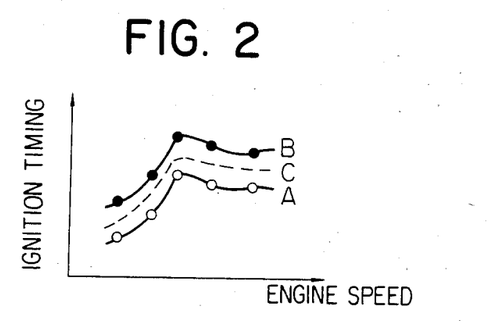
FIG. 2 shows an ignition timing characteristic as a function of engine speed.

FIG. 2 shows an ignition timing characteristic representing points A and B as a function of engine speed. It is seen that the interval between the characteristics A and B is constant as a function of the engine speed. Therefore, in an internal combustion engine with such a characteristic, it will be possible to increase the output of the engine by advancing the ignition timing by a predetermined angle if fuel used in the engine is changed over from the low-octane rating gasoline to the high-octane rating gasoline.

Also in the case where a mixed fuel of both gasolines is used for the engine, it will be possible to increase the output of the engine if the ignition timing is advanced in angle according to the mixture ratio of the fuel.

However, in a conventional ignition timing control apparatus for an internal combustion engine, the reference ignition timing characteristic is preset only for a predetermined gasoline, e.g. the low-octane rating gasoline. Therefore when using the high-octane rating gasoline, an increase in the output of the engine can not be expected without any change or modification thereof, so that the presetting of the reference ignition timing must be repeated towards the advance angle by some method.

Particularly, such a repeated presetting of the reference ignition timing is very hard when using the mixed fuel because, as shown in FIG. 2 by a dotted curve C, the knock limit exists between curves A and B according to the mixture ratio and so the possible advance limit is varied.

Even if the reference ignition timing has been again preset at the knock limits A and B, since the knock limits A and B in FIG. 1 may vary with environmental conditions during the operation of the engine such as temperature, humidity, etc, knocks easily arise at the time of transient operation such as an accelerated operation of the engine, and accordingly it is quite difficult to avoid the occurrence of engine knocks.

It has therefore been proposed in "Ignition Timing Control Apparatus for an Internal Combustion Engine" described and shown in the U.S. patent application Ser. No. 670,219 filed on Nov. 13, 1984 which is now assigned to the same assignees as this patent application that in the case where a mixture of high-octane premium gasoline and low-octane regular gasoline is used for the engine, a knock sensor detects knock signals on the basis of which a displacement magnitude for the reference ignition timing is determined to automatically regulate the reference ignition timing at an optimum ignition timing, and further during a transient operation of the engine or at a time of rapid transition of the environmental conditions, the ignition timing is controlled in the direction of retard angle on a real time basis, thereby immediately suppressing the occurrence of knocks.

However, this proposed ignition timing control is always applicable to any region or condition of an engine so that an improper displacement magnitude may be provided for a normal reference ignition timing when the engine is in a light load region or a rapid acceleration condition.

U.S. Pat. No. 3,822,583, titled "Method for Determining Octane Ratings of Fuels under Road Conditions" issued on July 9, 1974 to B. D. Keller et al. discloses an ignition timing control according to the octane rating of gasoline by a knock detection.

SUMMARY OF THE INVENTION

It is a general object of the invention to provide an ignition timing control apparatus for an internal combustion engine wherein the occurrence of knocks is detected, and a reference ignition timing displacement magnitude indicating the mixture ratio of a high-octane rating fuel and a low-octane rating fuel is determined according to the detected value, on the basis of which the reference ignition timing is set in the advance angle or retard angle direction, whereby the mixture ratio is determined to continuously adjust the reference ignition timing to an optimum angle. At the same time, the occurrence of knock is immediately suppressed by controlling the ignition timing in the direction of retard angle on a real time basis when knock arises at the time of a rapid variation of an environmental condition during the steady state engine operation or at the time of a transient operation.

It is a specific object of this invention is to provide an ignition timing control apparatus for an internal combustion engine in which in a light load region where no knocks occur or a rapid acceleration operating condition where excessive knocks occur, a displacement magnitude of a reference ignition timing is retained at a value of a normal operating condition, thereby providing a stable ignition timing control for any octane rating of fuel.

The present invention broadly resides in an ignition timing control apparatus for an internal combustion engine comprising: a sensing means for sensing knock signals of the engine; a knock signal deriving means, responsive to the output of the sensing means, for deriving the knock signals; means for generating reference ignition timing signals; a correction magnitude determining means for determining an ignition timing correction magnitude for suppressing the occurrence of knock from the output of the knock signal deriving means; a displacement magnitude determining means for determining from the output of the knock signal deriving means or the output of the correction magnitude determining means a displacement magnitude for the reference ignition timing corresponding to the octane rating of a fuel used in the engine; an ignition timing determining means responsive to the outputs of the correction magnitude determining means and the displacement magnitude determining means to determine an ignition timing of the engine; and, means for retaining the displacement magnitude when the engine is outside of a predetermined operating region or a predetermined operating condition.

As a preferred embodiment, the displacement magnitude for the reference ignition timing is determined only in an operating region where knock occurs.

The ignition timing determining means includes an interpolating operation means for performing an interpolating operation between two reference ignition timing characteristics according to a proportional factor corresponding to the octane rating of the fuel.

The knock signal deriving means preferably comprises a bandpass filter connected to the sensing means for passing therethrough only a frequency component inherent in the knocks, a noise level detector for converting the output of the bandpass filter into a DC voltage with a predetermined amplification, the DC voltage being higher than the noise component while lower than the knock component of the filtered output, and a comparator for comparing the outputs of the filter and the detector to derive the knock signals.

The correction magnitude determining means preferably comprises an integrator for integrating the output of the comparator, and an analog-digital converter connected to the integrator.

The displacement magnitude determining means comprises a pulse generator connected to the comparator to generate one pulse per the occurrence of the knock for one ignition, a counter connected to the pulse generator to count the output pulses of the generator and to provide a logic signal indicating the presence of a predetermined knock occurrence rate per a predetermined time interval, an up/down counter counted-up by the counter, a first timer for defining the predetermined time interval, a second timer for defining another predetermined time interval, longer than the predetermined time interval, counting-down the up/down counter. Alternatively, the displacement magnitude determining means may include an advance/retard decision unit for comparing the output of the A/D converter with a predetermined value to provide as an output therefrom an advance control signal or a retard control signal according to the compared result, first and second timers connected to the decision unit to receive the advance and retard control signals respectively, and an up/down counter counted up and down respectively by the first and second timers.

The ignition timing determining means preferably comprises first and second storage means for respectively storing first and second ignition timing characteristics for high-octane and a low-octane rating fuels respectively, an engine speed detecting means, a load condition detecting means, and an ignition timing computing unit for converting ignition timing data, determined by the engine speed detected by the engine speed detecting means and determined by a load condition detected by the load condition detecting means, into corresponding address data and for sending the address data to the first and second storage means.

In the case where the above former displacement magnitude determining means is used, the interpolating operation means preferably includes means for providing a proportional factor corresponding to the octane rating of the fuel based on the knock occurrence rate indicated by the displacement magnitude determining means, an interpolator for performing an interpolating operation according to the proportional factor between the first and the second ignition timing characteristics respectively stored in the first and second storage means, and a subtractor for subtracting the digital output of the correction magnitude determining means from the output of the interpolator. In the case where the above latter displacement magnitude determining means is used, the interpolating operation means may include an adder for adding the output of the correction magnitude determining means and the output of the displacement magnitude determining means, means for providing a proportional factor corresponding to the octane rating of the fuel based on the output of the adder, an interpolator for performing an interpolating operation according to the proportional factor between the first and the second ignition timing characteristics respectively stored in the first and second storage means.

The displacement magnitude retaining means preferably comprises a first digital comparator for comparing the load value of the address signal from the ignition timing computing unit with a predetermined light load value as a reference to provide an output indicating the light load only when the former value is lower than the latter value, a differential computing unit for computing the actual acceleration value from the load signal and the speed signal of the address signal from the ignition timing computing unit, a second digital comparator for comparing the computed acceleration value with a predetermined rapid acceleration value as a reference to provide an output indicating the rapid acceleration only when the actual acceleration value exceeds the reference acceleration value, and an OR gate for combining the outputs of the first and second comparators for retaining the displacement magnitude.

BRIEF DESCRIPTION OF THE DRAWINGS

FIGS. 5a-c show waveform graphs for explaining the operation of the knock signal deriving portion in FIG. 3;

FIGS. 6c-j show waveform diagrams taken out of the various places of the retard angle control magnitude determining portion and the reference ignition timing displacement magnitude determining portion shown in FIG. 3;

FIGS. 8d, 8k–n and 8p show waveform diagrams taken out of the various places of the reference ignition timing displacement magnitude determining portion shown in FIG. 7;

FIGS. 11a–i show disadvantageous waveform diagrams taken out of the various places of the retard angle control magnitude determining portion and the reference ignition timing displacement magnitude determining portion shown in FIG. 10 which does not include an improvement in responsiveness;

Throughout the figures, the same reference numerals indicate identical or corresponding portions and element.

DETAILED DESCRIPTION OF THE PREFERRED EMBODIMENTS

The present invention will now be described in detail along the preferred embodiments illustrated in the accompanying drawings.

Figure 3:
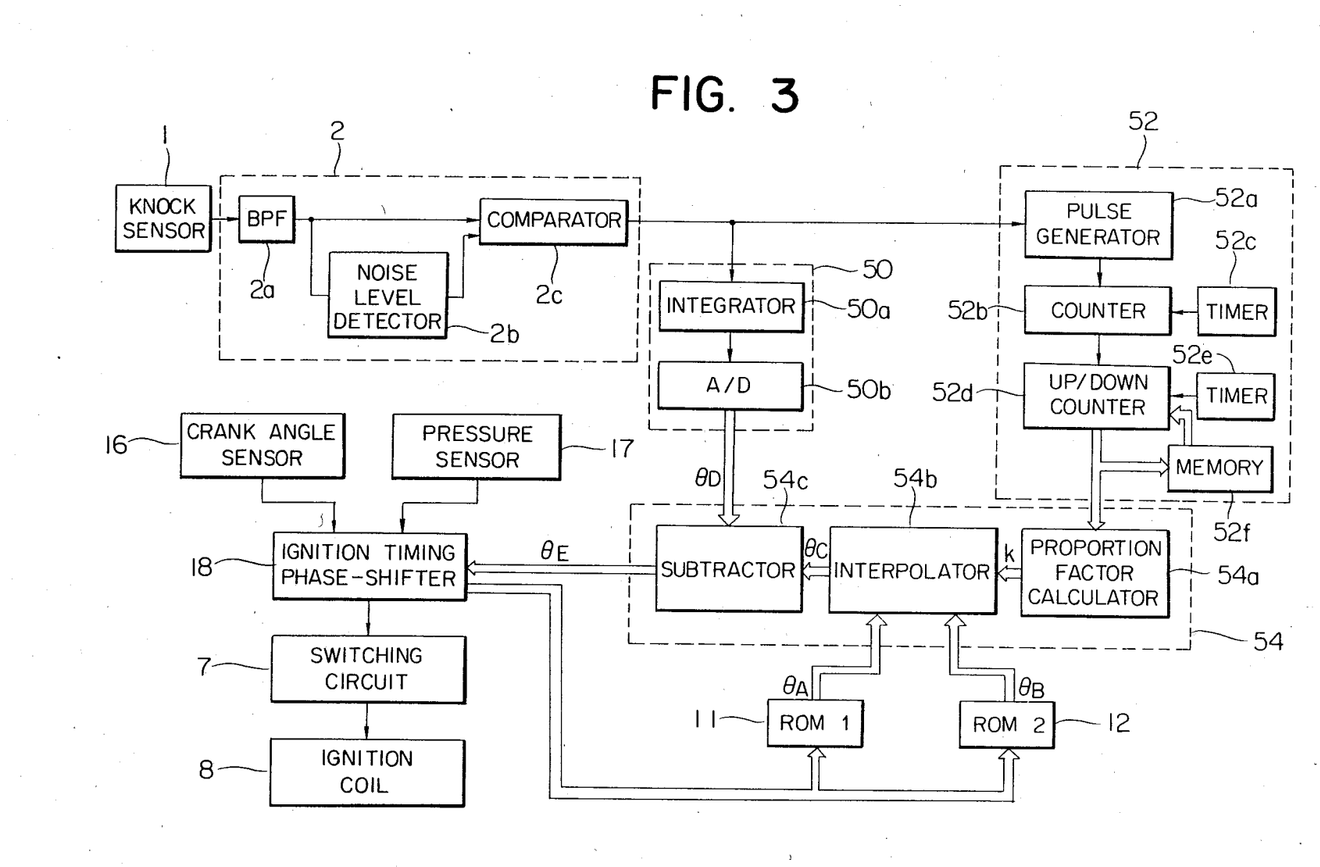
FIG. 3 shows a block diagram of a first embodiment of "Ignition Timing Control Apparatus for an Internal Combustion Engine" described and shown in the U.S. patent application Ser. No. 670,219 filed on Nov. 13, 1984 which is now assigned to the same assignee as this patent application.

FIG. 3 shows a circuit diagram of a first embodiment of a continuous ignition timing control apparatus for an internal combustion engine shown in the U.S. patent application Ser. No. 670,219, titled "Ignition Timing Control Apparatus for Internal Combustion Engine" filed on Nov. 13, 1984 claiming the priority rights based on Japanese Patent Application Nos. 58-213823, 59-18537, and 58-213822 and now assigned to the same assignee as this application. In the figure, a knock sensor 1 is mounted on an internal combustion engine (not shown) to sense knocks of the engine. The output signal of the knock sensor 1 is received by a knock signal deriving portion 2, enclosed with dotted lines, which is composed of a bandpass filter 2a, a noise level detector 2b, and a comparator 2c. The input of the bandpass filter 2a is connected to the knock sensor 1 and the output thereof is connected to the noise level detector 2b and one input of the comparator 2c. The output of the noise level detector 2b is connected to the other input of the comparator 2c.

The comparator 2c of the knock signal deriving portion 2 is connected to a retard angle control magnitude determining portion 50 and a reference ignition timing displacement magnitude determining portion 52. The retard angle control magnitude determining portion 50 includes an integrator 50a and an analog to digital (A/D) converter 50b. This retard angle control magnitude determining portion 50 serves as means for determining an ignition timing correction magnitude to suppress the occurrence of knocks of the engine according to the output of the portion 2, as described hereinafter. The reference ignition timing displacement magnitude determining portion 52 is formed of a pulse generator 52a, a counter 52b, a timer 52c, an up/down counter 52d, a timer 52e, and a memory 52f. The input of the pulse generator 52a is connected to the output of the comparator 2c and the output thereof is connected to the input of the counter 52b. The timer 52c is connected to the reset input of the counter 52b. The up-count input of the up/down counter 52d is connected to the output of the counter 52b and the down-count input thereof is connected to the timer 52e. The data input of the memory 52f is connected to the output of the up/down counter 52d and the data output thereof is connected to the preset input of the up/down counter 52d.

A first ignition timing computing unit 54 is formed of a proportion factor calculator 54a, an interpolator 54b, and a subtractor 54c. The proportion factor calculator 54a is connected to the output of the up/down counter 52d to convert the count of the up/down counter 52d into a proportion factor. The interpolator 54b is connected to the output of ROM's 11 and 12 as well as the output of the calculator 54a so that an interpolation is performed according to the proportion factor provided from the calculator 54a between the output data of the ROMs' 11 and 12s, thereby providing as an output an ignition timing data determined by the interpolation. The subtractor 54c has two inputs, one of which is connected to the output of the interpolator 54b and the other of which is connected to the output of the A/D converter 50b, and subtracts the output value of the A/D converter 50b from the ignition timing data from the interpolator 54b to provide an ignition timing data output, which is shifted in the retard direction, to a second ignition timing computing unit 18.

Figure 4:
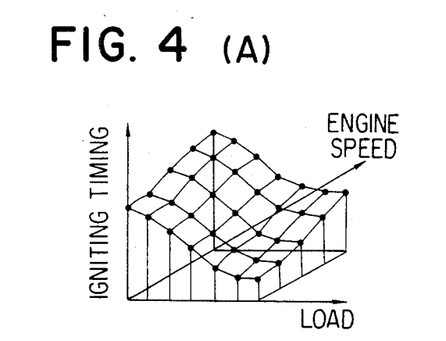
FIGS. 4a and 4b show maps of ignition timing characteristics stored in a memory, depending on the octane rating of a fuel.

The ROM's 11 and 12 which are first and second ignition timing characteristic memory portions have stored therein ignition timing data at corresponding memory addresses determined by an engine and a load condition as illustrated in FIGS. 4(A) and 4(B). FIG. 4(A) shows data of the ROM 11 set for e.g. the low-octane gasoline while FIG. 4(B) shows data of the ROM 12, set for the high-octane gasoline, positioned in the side of advance angle in relation to FIG. 4(A).

A crank angle sensor 16 detects the crank rotational angle of the engine, and a pressure sensor 17 detects intake air pressure of the engine. The above noted ignition timing computing unit 18 computes the engine speed from the output signal of the crank angle sensor 16, determines the load condition of the engine from the output signal of the pressure sensor 17, and converts the value determined by the engine speed and the load condition into an address value, which is sent to the ROM's 11 and 12. The ignition timing computing unit 18 also reads out the output data of the subtractor 54c, computes the ignition timing from the output data of the subtractor 54c on the basis of the output signal of the crank angle sensor 16, and sends the ignition signal to a switching circuit 7 and then an ignition coil 8. The switching circuit 7 energizes or deenergizes an ignition coil 8 in synchronization with the output signal of the computing unit 18 to produce a high voltage necessary for the ignition of the engine.

Figure 5:
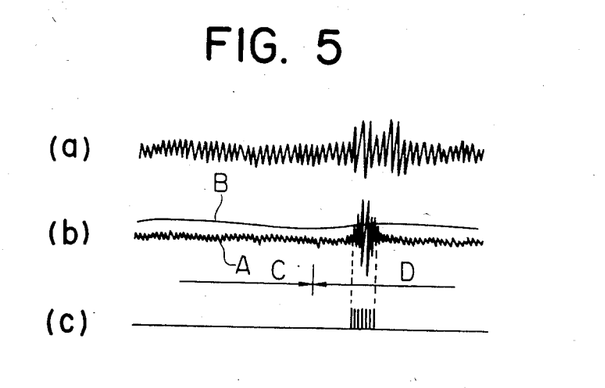
Figure 6:
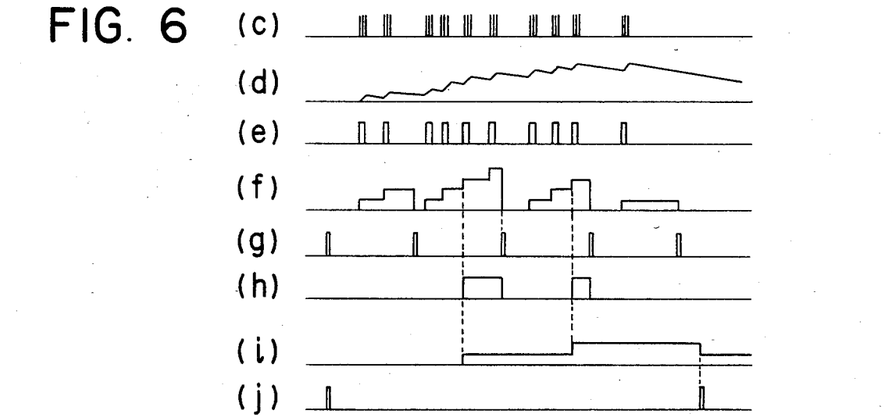

The operation of each of the block portions will now be described with reference to FIGS. 5 and 6. FIG. 5 shows waveforms indicating the operation of each of the circuits in the knock signal deriving portion 2, and FIG. 6 shows waveforms indicating the operation of each of the circuits in the portions 50 and 52.

The knock sensor 1 is a vibration acceleration sensor generally well known as being mounted on the cylinder block (not shown) etc., of an engine, which converts the mechanical vibration into an electrical signal, and generates a vibrating wave signal, as shown in FIG. 5(a), received by the bandpass filter 2a. The bandpass filter 2a only passes therethrough a frequency component inherent in knocks, comprising a noise component and a knock component, from the output signal of the knock sensor 1, thereby suppressing a noise component not relating to knocks to provide an output good in S/N ratio as shown in FIG. 5(b) by wave-form A.

The noise level detector 2b may be composed of, e.g. a half-wave rectifying circuit, an averaging circuit, and an amplifying circuit etc. The noise level detector 2b converts the output of the bandpass filter 2a (FIG. 5(b), wave-form A) into a DC voltage by the half-wave rectification and the averaging operations, the DC voltage being amplified with a predetermined amplification to have a level, as shown in FIG. 5(b) by a wave-form B, higher than the noise component of the output signal of the bandpass filter 2a (FIG. 5(b), wave-form A) but lower than the knock component of the same.

The comparator 2c compares the output signal of the noise level detector 2b (FIG. 5(b), wave-form B) with the output of the bandpass filter 2a (FIG. 5(b), wave-form A). In the case where no knock occurs (FIG. 5, section C), since the output signal of the bandpass filter 2a (FIG. 5(b), wave-form A) is not greater than the output signal of the noise level detector 2b (FIG. 5(b), wave-form B), the comparator 2c provides no output, while in the case where knocks occur (FIG. 5(b), section D), since the former signal is greater than the latter signal, the comparator 2c provides as an output a pulse train as shown in FIG. 5(c). Accordingly, the output pulse train from the comparator 2c can be used for determining whether or not knocks have occurred.

When the knock signal deriving portion 2 derives knock signals as shown in FIG. 5(c), the comparator 2c provides as an output a pulse train as shown in FIG. 6(c). As shown in FIG. 6(d), this pulse train causes the output of the integrator 50a to be increased to retard the angle of the ignition timing, thereby suppressing the occurrence of knocks on a real time basis. On the other hand, when knock ceases, the output voltage of the integrator 50a decreases to return the ignition timing to the last advance angle.

Therefore, the retard angle control magnitude determining portion 50, as shown in FIG. 6(d) by the output of the integrator 50a, forms a closed loop control system for retarding the angle of the ignition timing up to a knock limit point on a real time basis in response to the occurrence of knocks. While the rising rate or the falling rate of the output voltage of the integrator 50a is dependent upon the responsiveness in retard angle or the stability of the closed loop control, it is set at a relatively high responsiveness because of the requirements of immediate response to knocks.

The displacement magnitude determining portion 52 serves to determine a displacement magnitude for the reference ignition timing according to the occurrence rate of knocks. The pulse generator 52a receives as an input the pulse train output (FIG. 6(c)) from the comparator 2c and then provides output pulses (FIG. 6(e)). That is to say, the pulse generator 52a provides one output pulse in response to a group of knocks which occur during one ignition. The output pulses of the pulse generator 52a are counted by the counter 52b, the count value being shown in FIG. 6(f). The timer 52c provides one output pulse (FIG. 6(g)) per a predetermined time interval to the counter 52b whose count is reset to zero by the output pulse of the timer 52c. The output of the counter 52b becomes a logic high level when the count value of the counter 52b exceeds a predetermined value which is "count 3" in this case, as shown in FIG. 6(h). This means that when a predetermined number of knocks has occurred within a predetermined time interval, i.e. the occurrence rate of knocks has exceeded a predetermined value, the counter 52b provides a high level output signal.

The up/down counter 52d counts up by one when the output of the counter 52b has a logical transition from the low level "0" to the high level "1". The timer 52e provides one output pulse per a predetermined time interval as shown in FIG. 6(j) to the up/down counter 52d which is counted-down by one by the output of the timer 52e. The count of the up/down counter 52d is shown in FIG. 6(i).

The memory 52f stores the count of the up/down counter 52d at the time of the ignition switch being turned off or at the time of a reduction in the power source voltage, while presetting the stored count as the count of the up/down counter 52d. Namely, even if the engine is stopped, the memory 52f enables a displacement magnitude of the reference ignition timing to be retained.

Thus, the reference ignition timing displacement magnitude determining portion 52 determines the occurrence rate of knocks and then produces a displacement magnitude to retard the reference ignition timing by the output of the up/down counter 52d if the occurrence rate of knocks exceeds a predetermined value while the displacement magnitude is shifted toward the advance angle if the displacement magnitude is not shifted toward the retard angle within a predetermined time interval.

Therefore, the displacement magnitude determining portion 52, similar to the retard angle control magnitude determining portion 50, also forms a closed loop control system for retarding/advancing the ignition timing according to the occurrence of knocks, through the first and second ignition timing computing units 54 and 18. However, both portions are different in that the portion 50 controls the ignition timing in the direction of retard angle on a real time basis in order to suppress the occurrence of knocks by the detection thereof whereas the portion 52 according to the occurrence rate of knocks by the detection thereof and then displaces the reference ignition timing in the direction of retard angle or advance angle thereby to provide a reference ignition timing corresponding to the octane rating of a fuel used for the engine. Therefore, the responsiveness in displacement of the determining portion 52 toward the advance angle or the retard angle is set more slowly than that of the determining portion 50.

Now the first ignition timing computing unit 54 will be described.

The proportion factor calculator 54a changes the output count of the up/down counter 52d into a proportion factor. Assuming that the proportion factor calculator 54a receives as an input thereto an output count N of the up/down counter 52d, this count N is divided by a maximum preset count value Nmax from the up/down counter 52d, the result being assumed to be a proportion factor k (=N/Nmax). Therefore, in the case where premium gasoline is used, the knock limit point is relatively positioned in the direction of advance angle, and accordingly the count N of the up/down counter 52d will be substantially zero so that the proportion factor k becomes equal to zero. On the other hand, in the case where regular gasoline is used, the knock limit point is relatively positioned in the direction of retard angle, and accordingly the count N of the up/down counter 52d will be substantially Nmax so that the proportion factor k becomes equal to 1. Further in the case where mixed gasoline of premium and regular gasolines is used, as shown in FIG. 2 by the characteristic curve C, the knock limit characteristic exists between those in the case where premium gasoline is used and in the case where regular gasoline is used so that the count N of the up/down counter 52d assumes a value between zero and Nmax, i.e. $0<N<Nmax$, thereby $0<k<1$. Therefore, it can be seen that the proportion factor k indicates the mixture ratio of premium gasoline and regular gasoline.

Meanwhile, the ROMs' 11 and 12 receive as inputs an address value corresponding to the engine speed and the engine load from the second ignition timing computing unit 18 and then provides as an output the ignition timing data stored in that address to the interpolator 54b. Assuming that the ignition timing characteristic stored in the ROM 11 be set for premium gasoline and that the ignition timing data in that address be $\theta_B$, and that the ignition timing characteristic stored in the ROM 12 be set for regular gasoline and that the ignition timing data in that address be $\theta_A$, the ignition timing characteristic of the ROM 11 is set at the same timing as that of the ROM 12 or toward the advance angle beyond the latter so that $\theta_A<\theta_B$. Hence the interpolator 54b performs the interpolating operation according to the proportion factor k between $\theta_A$ and $\theta_B$. Namely, the operation of $\theta_B-k(\theta_B-\theta A)$ is performed, the resultant value $\theta_C$ as assumed, having a value divided proportionally by a ratio of $k:(1-k)$ between $\theta_B$ and $\theta_A$. Therefore, it will be found that when premium gasoline is used, $\theta_C=\theta_B$ because $k=0$, when regular gasoline is used, $\theta_C=\theta_A$ because $k=1$, and when a mixture of premium and regular gasolines is used, $\theta_A<\theta_C<\theta_B$ because $0<k<1$. Therefore, $\theta_C$ has a value proportionally divided between $\theta_A$ and $\theta_B$ on the basis of a proportion factor k indicating the mixture ratio of premium and regular gasolines so that even though a mixture of premium and regular gasolines is used, an optimum reference ignition timing can be provided according to the mixture ratio of premium high-octane gasoline and regular low-octane gasoline, by means of the above interpolation.

Furthermore, in the first ignition timing computing unit 54, the subtractor 54c subtracts from the output value $\theta_C$ of the interpolator 54b the output value $\theta_D$ of the A/D converter 50b in the retard angle control magnitude determining portion 50 to provide as an output therefrom the ignition timing data of $\theta_E(=\theta_C-\theta_D)$ to the second ignition timing computing unit 18. Namely, the subtractor 54c performs a retard angle correction for the reference ignition timing by subtracting the retard angle control magnitude from the optimum reference ignition timing obtained by the interpolator 54b in order to suppress knocks occurring during a transient operation of the engine or at a time of rapid transition of the environmental condition.

The above-noted U.S. patent application also includes, as a second embodiment, a modification of the first embodiment of the ignition timing control apparatus for an internal combustion engine shown in FIG. 3 which will now be described with reference to FIGS. 7 and 8.

Figure 7:
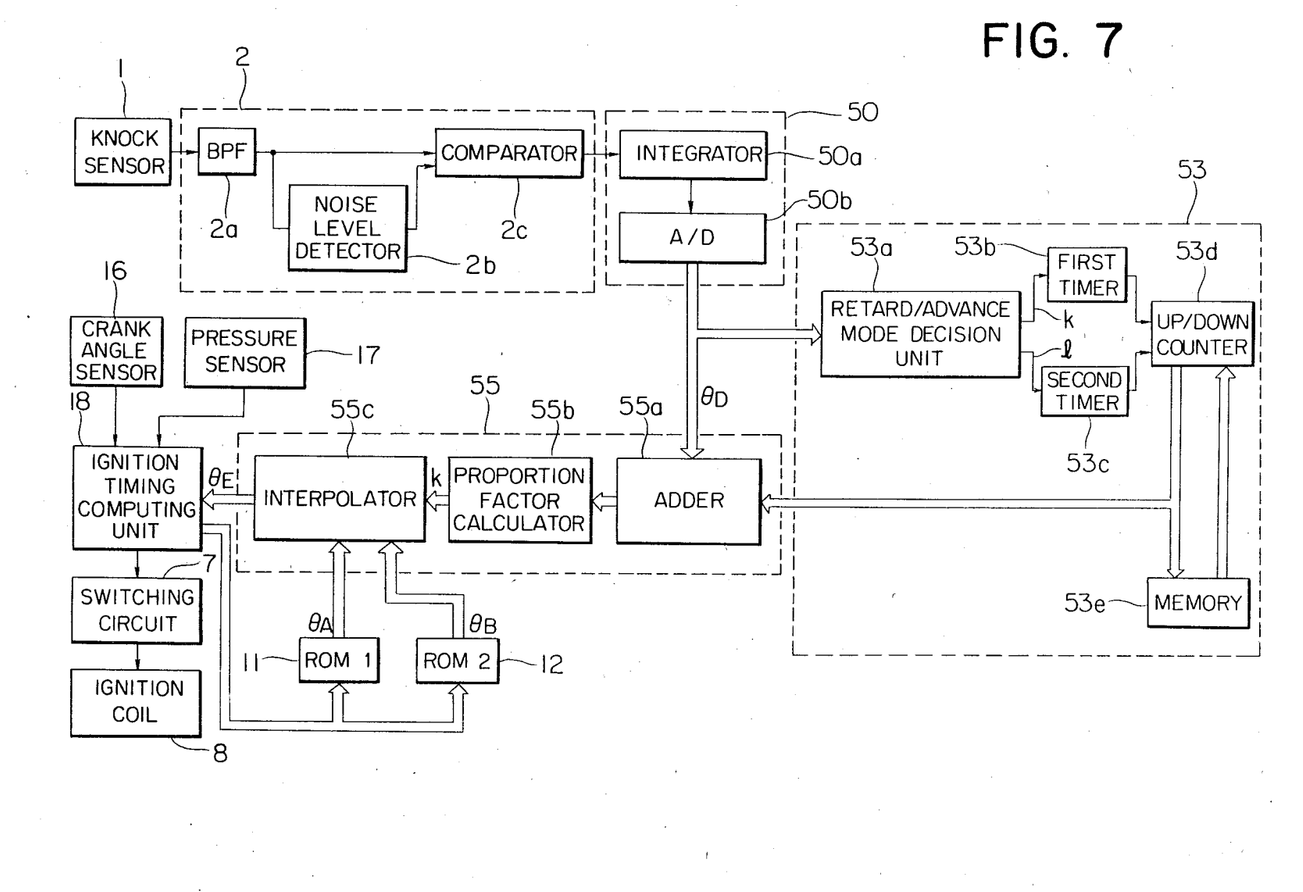
FIG. 7 shows a block diagram of an arrangement of a second embodiment of an ignition timing control apparatus for an internal combustion engine in the above-noted U.S. patent application.

This modification shown in FIG. 7 is different from the first embodiment only in the arrangement of the reference ignition timing displacement magnitude determining portion, in the arrangement of the first ignition timing computing unit, and in the connection of the retard angle control magnitude determining portion, the reference ignition timing displacement magnitude determining portion, and the first ignition timing computing unit. Therefore, the description of the portions or elements denoted by the same reference numerals in both embodiments will not be repeated.

In FIG. 7, the reference ignition timing displacement magnitude determining portion 53 is formed of a retard-/advance mode decision unit 53a, a first timer 53b, a second timer 53c, an up/down counter 53d which may be the same as the up/down counter 52d, and a memory 53e which may be the same as the memory 52f; and the first ignition timing computing unit 55 is formed of an adder 55a, a proportion factor calculator 55b which may be the same as the calculator 54a, and an interpolator 55c which may be the same as the interpolator 54b.

The retard/advance mode decision unit 53a has one input terminal connected to the output terminal of the retard angle control magnitude determining portion 50 to receive the output of the A/D converter 50b and has two output terminals one of which is, as a retard mode output, connected to the first timer 53b and the other of which is, as an advance mode output, connected to the second timer 53c, thereby comparing the output value of the A/D converter 50b with a predetermined value and consequently providing the retard mode output or the advance mode output.

The output terminals of the timers 53b and 53c are respectively connected to the up-count input terminal and the down-count input terminal of the up/down counter 53d. The input terminal of the memory 53e is connected to the output terminal of the up/down counter 53d while the output terminal of the memory 53e is connected to the preset input terminal.

The adder 55a has two input terminals one of which is connected to the output terminal of the reference ignition timing displacement magnitude determining portion 53, namely, the output terminal of the up/down counter 53d and the other of which is connected to the output terminal of the retard angle control magnitude determining portion 50, namely, or the output terminal of the A/D converter 50b. The output terminal of the adder 55a is connected to the input terminal of the proportion factor calculator 55b. The interpolator 55c receives as inputs thereto output data of the ROMs' 11 and 12 as well as the output value of the proportion factor calculator 55b while providing as an output therefrom the calculated result to the second ignition timing computing unit 18.

It will be seen from FIGS. 3 and 7 that while in the first embodiment the output of the comparator 2c is connected to the inputs of the integrator 50 as well as the pulse generator 52a, in the second embodiment the output of the comparator is only connected to the input of the integrator 50a.

Figure 8:
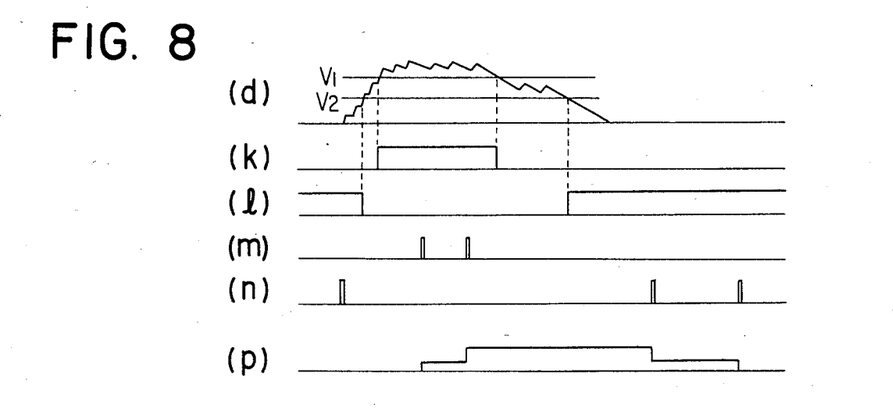

FIG. 8 shows various waveforms in the operation of the reference ignition timing displacement determining portion 53 shown in FIG. 7. FIG. 8(d) shows the output voltage of the integrator 50a which is converted into a digital value by the A/D converter 50b. The retard/advance mode decision unit 53a has two reference values to be compared with its input value, one of which is a retard mode decision reference (V1) and the other of which is an advance mode decision reference (V2), whereby the output value of the A/D converter 50b is compared with the retard mode decision reference and the advance mode decision reference.

Figure 9:
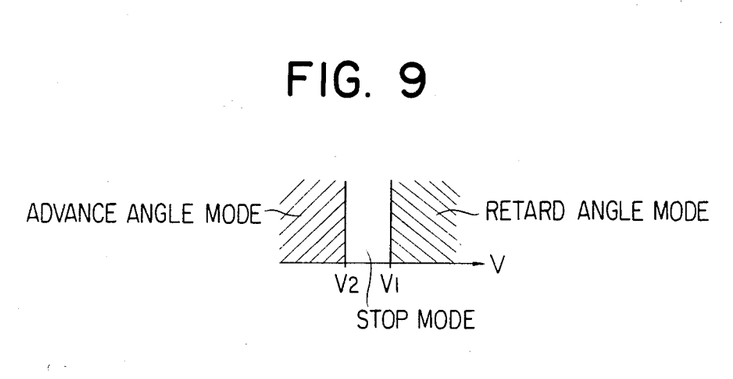
FIG. 9 shows a diagram for explaining the output modes of the retard/advance mode decision unit shown in FIG. 7.

FIG. 9 shows the output modes of the decision unit 53a. Now, when the output value V of the A/D converter 50b is above the retard mode decision reference V1, the decision unit 53a assumes the retard angle mode, thereby rendering the retard mode output thereof at a high logic level as shown in FIG. 8(k) while when the output value of the A/D converter 50b is below the advance mode decision reference V2, the decision unit 53a assumes the advance angle mode, thereby rendering the advance mode output thereof at the high level as shown in FIG. 8(l). When the output value of the A/D converter 50b is intermediate between the references V1 and V2, the decision unit 53a assumes a stop mode where the retard mode output and the advance mode output are at a low logic level.

While the retard mode output of the decision unit 53a is at the high level, the timer 53b provides as an output therefrom one pulse per a predetermined time interval as shown in FIG. 8(m). While the advance mode output of the decision unit 53a is at the high level, the timer 53c provides as an output therefrom one pulse per a predetermined time interval as shown in FIG. 8(n).

FIG. 8(p) shows the count of the up/down counter 53d which up-counts the output pulses of the timer 53b and down-counts the output pulses of the timer 53c. Therefore, when the output value of the A/D converter 50b is greater than the retard mode decision reference V1, the retard angle mode appears, thereby up-counting the count of the up/down counter 53d, when the output value of the A/D converter 50b is smaller than the advance angle reference V2, the advance angle mode appears, thereby down-counting the count of the up/down counter 53d, and when the output value of the A/D converter 50b is intermediate between the references V1 and V2, the stop mode appears, thereby retaining the current count of the up/down counter 53d.

As to the operation of the first ignition timing computing unit 55, the adder 55a adds the output value of the A/D converter 50b with the output value of the up/down counter 53d. It is repeated that the output value of the A/D converter 50b or the retard angle control magnitude determining portion 50 indicates a retard control angle for suppressing knocks on a real time basis while the output value of the up/down counter 53d or the reference ignition timing displacement magnitude determining portion 53 indicates a regulating value for the reference ignition timing according to the octane rating of the fuel in use. Therefore, the adder 55a provides as an output therefrom the sum of the retard control angle and the regulating value for the reference ignition timing. Then, the proportion factor calculator 55b converts the output value of the adder 55a into a corresponding proportion factor according to which the interpolator 55c interpolates the ignition timing data of the ROMs' 11 and 12 as in the first embodiment of the above-noted U.S. patent application.

Thus, in this modification, the reference ignition timing displacement magnitude determining portion 53 decides whether the retard mode or the advance mode should be selected, on the basis of the output value of the determining portion 50, and determines a regulating value for the reference ignition timing, whereby an ignition timing calculation is made on the basis of the output values of the determining portion 50 and 53.

As described above, according to the first and second embodiments of the above-noted U.S. patent application, in the case where a mixture of high-octane premium gasoline and low-octane regular gasoline is used for the engine, a knock sensor detects knock signals on the basis of which a displacement magnitude for the reference ignition timing is calculated to automatically regulate the reference ignition timing at an optimum ignition timing, and further during a transient operation of the engine or at a time of rapid transition of the environmental conditions, the ignition timing is controlled in the direction of retard angle on a real time basis, thereby immediately suppressing the occurrence of knocks.

In the above first and second embodiments of the above-noted U.S. patent application which satisfactorily perform their functions by themselves, however, since the displacement magnitude for the reference ignition timing is determined in response to the detection of knocks, they are not effective when the engine is in a certain operating region or in a certain operating condition.

More specifically, since the ignition timing displacement magnitude is determined in response to the occurrence of knocks which are not detected in an operating region such as a light load where no knocks normally arise, in a case where mixture of the regular gasoline and high octane gasoline is used, the reference ignition timing will be continuously updated in the direction of the advance angle, with the result that the normal displacement magnitude for the reference ignition timing can not be maintained. Also in an unstable operating condition of the engine such as a rapid acceleration, since excessive knocks may occur some times beyond a stable (steady state) operating condition of the engine, the reference ignition timing displacement magnitude in such a stable operating condition can not be maintained in such a case.

Figure 10:
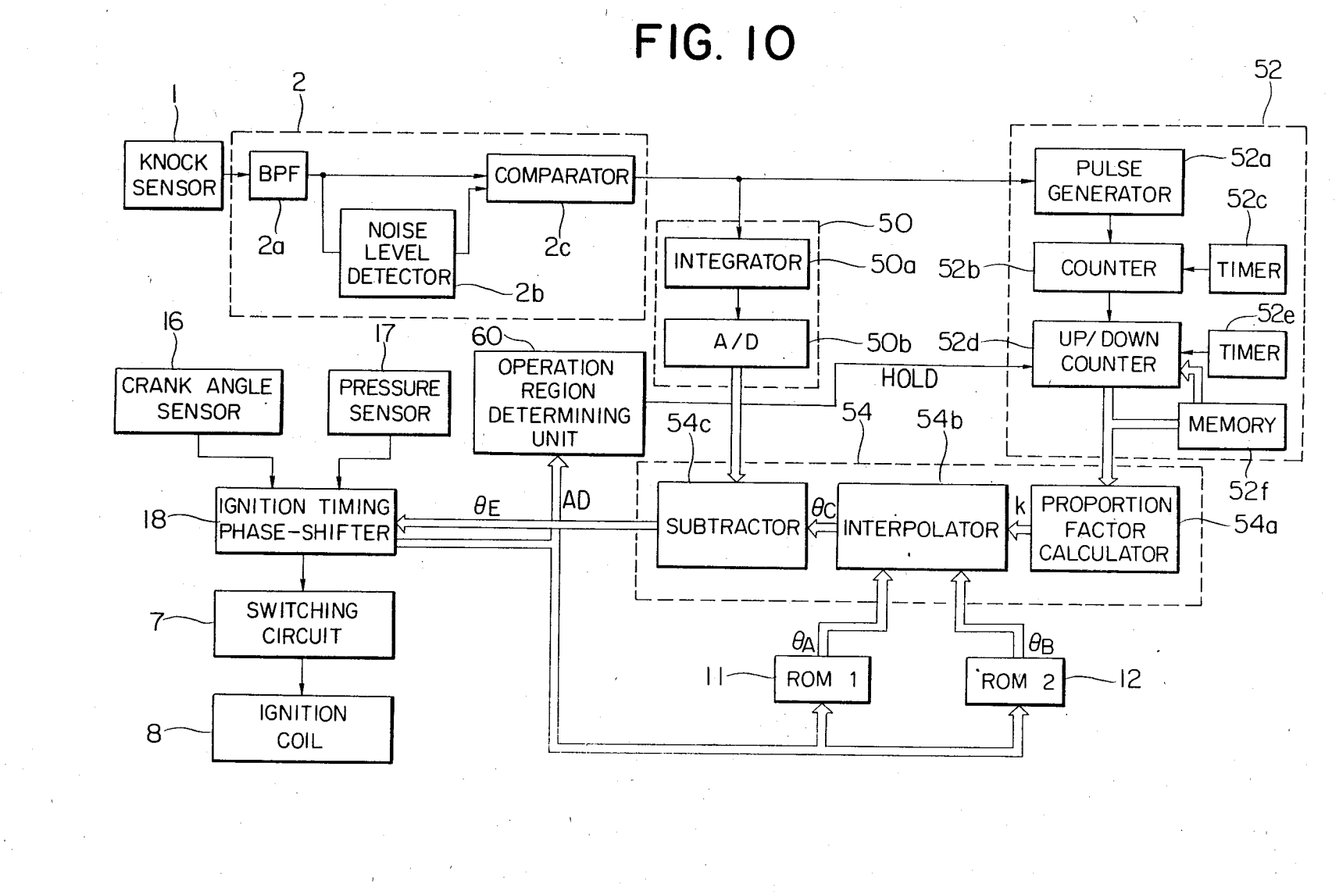
FIG. 10 shows a block diagram of an arrangement of a first embodiment of an ignition timing control apparatus for an internal combustion engine in accordance with this invention.

FIG. 10 shows a block diagram of a first embodiment of this invention for eliminating the above defect in the above-noted U.S. patent application. The arrangement of this embodiment is the same as that shown in FIG. 3, except for the provision of an operation region determining unit 60 in this embodiment of this invention so that the description of the corresponding portions and elements denoted by the same reference numerals will not be repeated.

The input of the operation region determining unit 60 is connected to the output of the second ignition timing computing unit 18 along with the ROMs' 11 and 12, and the output of the operation decision unit 60 is connected to the up/down counter 52d.

As described above, in a light load region where the engine generates no knocks or in a rapid acceleration condition where excessive knocks arise, it is necessary to prevent the displacement magnitude in the reference ignition timing displacement magnitude determining portion 52 from being updated. Accordingly, the operation region determining unit 60 receives as an input thereto an address signal AD.

Figure 13:
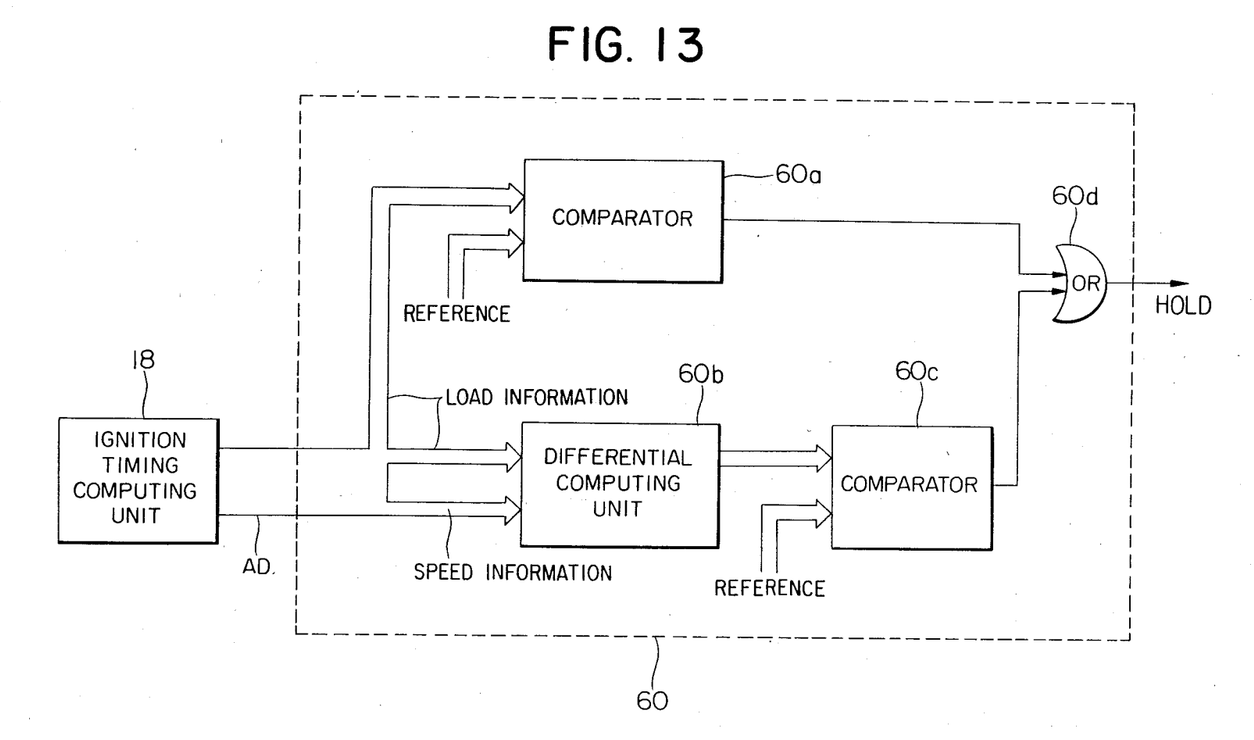

This address signal AD is, as shown in FIG. 13, determined by the engine speed signal from the crank angle sensor 16 and the engine load signal from the pressure sensor 17, from the second ignition timing computing unit 18. The load information of the address signal AD is compared in a digital comparator 60a in the operation region determining unit 60. Bits indicating the actual load information of the address signal AD are compared in the comparator 60a with reference digital bits corresponding to a predetermined reference light load. Only if the actual load is lower than the reference light load, the comparator 60a provides an output indicating that the engine is in a light load region. On the other hand, the load information or the speed information of the address signal AD as a function of time are received by a differential computing unit 60b which differentiates those information to provide as an output therefrom the actual acceleration condition. The differentiated result, i.e. the actual acceleration condition is compared with a predetermined reference acceleration value corresponding to a certain rapid acceleration condition. Only if the actual acceleration value is higher than the reference rapid acceleration value, the comparator 60c provides an output indicating that the engine is in a rapid acceleration condition. Then, the results of the light load region and the rapid acceleration condition are combined by an OR logic gate 60d and the combined result is provided from the determining unit 60 as an output signal HOLD indicating the determined result of the operating region or condition. Namely, when the engine is in a light load region or a rapid acceleration condition, the output signal HOLD is sent to the up/down counter 52d of the determining portion 52.

Figure 11:
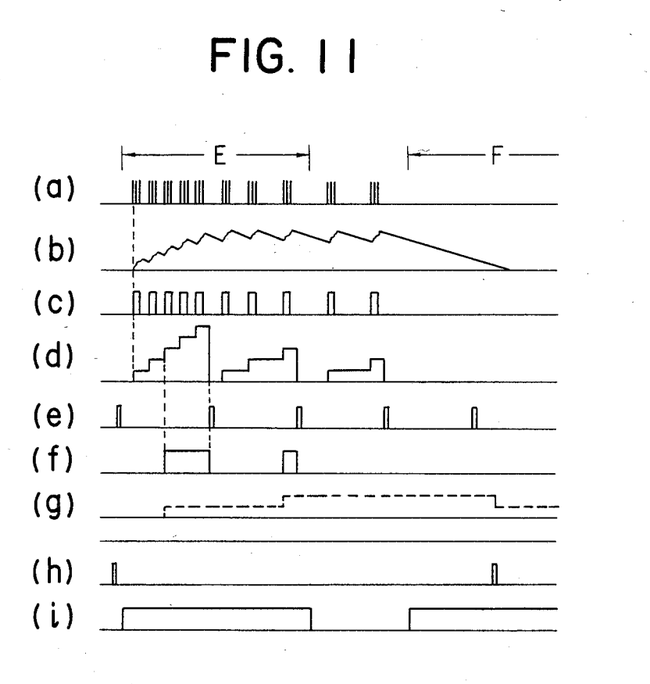

FIG. 11 shows various waveforms at different points of the pre-determined reference ignition timing displacement determining portion 60 in the light load (deceleration) region or the rapid acceleration condition of the engine. The waveforms shown in FIG. 11(a)-(h) detected at various places of the arrangement of FIG. 10 correspond to those shown in FIG. 6(c)-(j) detected at various places of the arrangement of FIG. 3. FIG. 11(i) shows the waveform of the signal HOLD.

In the rapid acceleration condition represented by a portion E in FIG. 11(a), since a large number of knocks are detected, the output count of the up/down counter 52d is displaced toward the retard angle while in the light load region represented by a portion F in FIG. 11(a), since no knocks are detected, the output count of the up/down counter is displaced toward the advance angle. Therefore, if the decision unit 60 in FIG. 10 were not included, the output count of the up/down counter 52d would assume the dotted lines as shown in FIG. 11(g).

However, since in either case the output signal HOLD of the determining unit 60 has the high level in the rapid acceleration condition or the light load region, the up/down counter 52d holds the count value at that time as shown by a solid line in FIG. 11(g) regardless of whether or not it receives the up-counting input (FIG. 11(f)) from the counter 52b or the down-counting input (FIG. 11(h)) from the timer 52e.

Therefore, in the case of the engine being in the rapid acceleration condition or the light load region, the reference ignition timing displacement magnitude determining portion 52 can hold the output count of the up/down counter 52d at that time.

Figure 12:
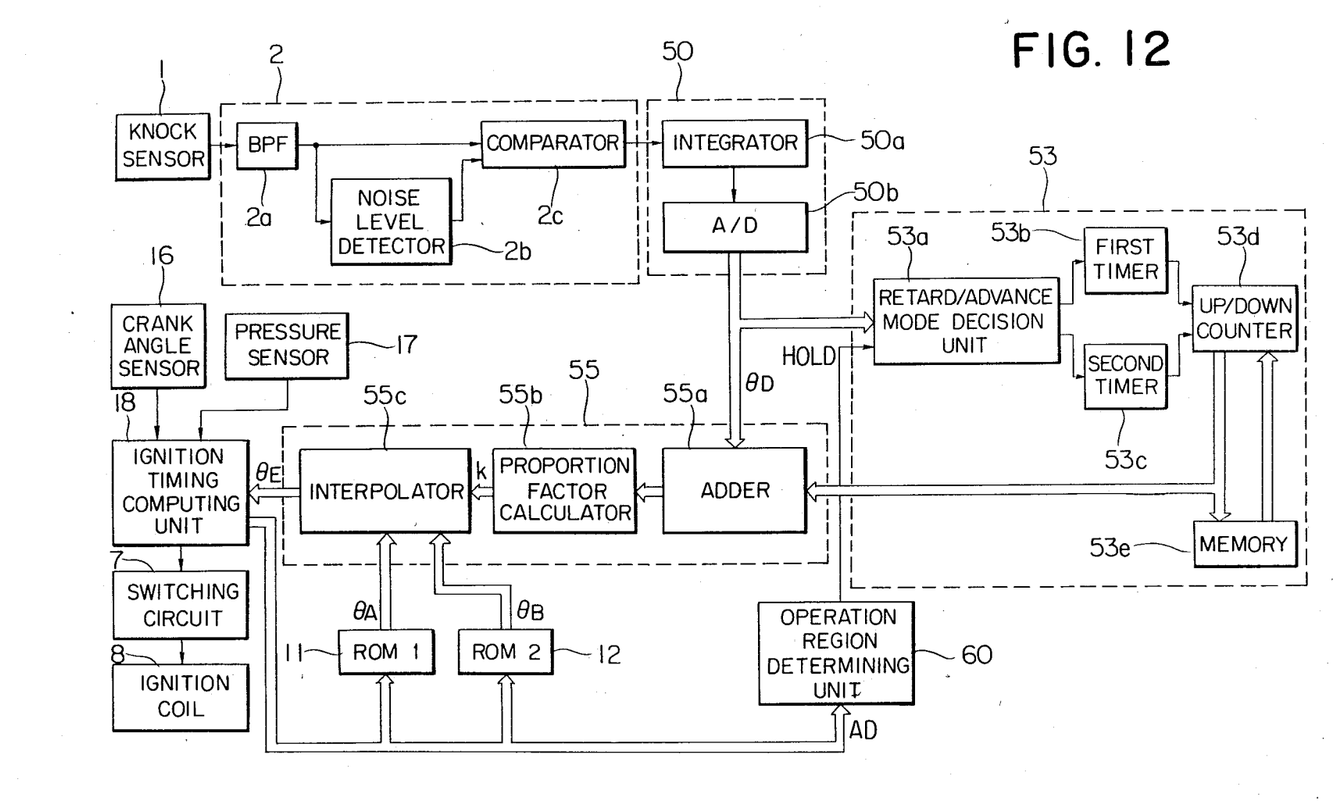
FIG. 12 shows a block diagram of an arrangement of a second embodiment of an ignition timing control apparatus for an internal combustion engine in accordance with this invention; and, FIG. 13 shows a detailed diagram of the operation region determining unit used in FIGS. 10 and 12.

FIG. 12 shows a second embodiment of this invention. The arrangement of this embodiment is the same as that of the second embodiment of the above-noted U.S. patent application shown in FIG. 7 except for the provision of an operation region determining unit 60 in the second embodiment of this invention so that the description of the corresponding portions and elements denoted by the same reference numerals will not be repeated.

The input of the operation region determining unit 60 is connected to the second ignition timing computing unit 18 along with the ROMs' 11 and 12, and the output thereof is connected to the retard/advance mode decision unit 53a.

As described in the above first embodiment shown in FIGS. 10 and 11, since when the engine is in the rapid acceleration condition or the light load region the determining unit 60 holds the output signal HOLD at the high level, the retard/advance mode decision unit 53a causes its two outputs to be fixed at the low level, whereby both timers 53b and 53c provide no counting signal to the up/down counter 53d. As a result, the up/down counter 53d makes no updating operation of count value, thereby holding the pre-determined count value at that time.

According to the above first and second embodiments of this invention, even though knock signals are detected in the engine operation in a rapid acceleration condition or a light load region, the pre-determined displacement magnitude at that time of the reference ignition timing can be maintained, thereby realizing an optimum reference ignition timing for the engine without being affected by the mixing ratio of gasolines.

It will be appreciated from the above embodiments of this invention that the subject matter of this invention consists of the combination of a modification of advance angle and a real time correction of advance angle. Particularly, this invention can carry out a continuous control for ignition timing wherein in a predetermined operation region of an engine the continous control is fixed to a normal operating state. In this control, regardless of whether a regular low-octane gasoline or a premium high-octane gasoline is used for an engine, this invention can perform an optimum ignition timing control to provide a desirable output by the engine.

It should be also noted that this invention is not limited to the embodiments described above but various modification can be made without departing from the spirit of this invention.

We claim:

1. An ignition timing control apparatus for an internal combustion engine having reference ignition timing comprising:

sensing means for sensing vibrations including knocks of said engine;

knock signal deriving means for deriving knock signals from the output of said sensing means;

correction magnitude determining means for determining from said knock signals derived by said knock signal deriving means an ignition timing correction magnitude for suppressing the occurence of knock;

displacement magnitude determining means for determining from at least one of an output of said knock signal deriving means and an output of said correction magnitude determining means a displacement magnitude for said reference ignition timing corresponding to the octane rating of fuel used in said engine; and ignition timing determining means for setting the reference ignition timing at an optimum ignition timing angle for said engine responsive to the correction magnitude determined by said correction magnitude determining means and the displacement magnitude determined by said displacement magnitude determining means; and means for retaining a pre-determined displacement magnitude when said engine is outside at least one of a predetermined operating region and a predetermined operating condition so that said ingition timing determining means sets the reference ignition timing according to the retained pre-determined displacement magnitude when said engine is outside one of said region and said condition, respectively.

2. An ignition timing control apparatus for an internal combustion engine according to claim 1 wherein said displacement magnitude for said reference ignition timing is determined only in an operating region where knock occurs.

3. An ignition timing control apparatus for an internal combustion engine according to claim 1 wherein said ignition timing determining means includes an interpolating operation means for performing an interpolating operation between two reference ignition timing characteristics according to a proportional factor corresponding to the octane rating of said fuel.

4. An ignition timing control apparatus for an internal combustion engine according to claim 3 wherein said knock sensing means comprises a vibration acceleration sensing means.

5. An ignition timing control apparatus for an internal combustion engine according to claim 4 wherein said knock signal deriving means comprises a bandpass fiber connected to said sensing means for passing therethrough an output having only a frequency component inherent in the knocks comprising a noise component and a knock component, a noise level detector for converting the output of said bandpass filter into a DC voltage with a predetermined amplification, said DC voltage being higher than the noise component while lower than the knock component of the filter output, and a comparator for comparing the outputs of said filter and said noise level detector to derive said knock signals.

6. An ignition timing control apparatus for an internal combustion engine according to claim 5 wherein said correction magnitude determining means comprises an integrator for integrating an output of said knock signal deriving means, and an A/D converter connected to said integrator.

7. An ignition timing control apparatus for an internal combustion engine according to claim 5 wherein said displacement magnitude determining means comprises a pulse generator connected to said comparator to generate one pulse per occurrence of said knock for one ignition, a counter connected to said pulse generator to count output pulses of said generator and to provide a logic signal indicating the presence of a predetermined knock occurrence rate per a first predetermined time interval set by a first timer, an up/down counter for counting up by one when said logic signal changes and for counting down by one per a second predetermined time interval set by a second timer, said second time interval being longer than said first predetermined time interval.

8. An ignition timing control apparatus for an internal combustion engine according to claim 6 wherein said displacement magnitude determining means includes an advance/retard decision unit connnected to said A/D converter for comparing the output of said A/D converter with a predetermined value to provide as outputs therefrom an advance control signal and a retard control signal according to the compared result, first and second timers connected to said decision unit to receive said advance and retard control signals, respectively, and an up/down counter for counting up and down, respectively, by said first and second timers.

9. An ignition timing control apparatus for an internal combustion engine according to claim 3 wherein said ignition timing determining means comprises first and second storages for respectively storing first and second ignition timing characteristics for high-octance and low-octance rating fuels, respecitvely, an engine speed detecting means, a load condition detecting means, and an ignition timing computing unit for converting ignition timing data, determined by engine speed detected by said engine speed detecting means and by a load condition detected by said load condition detecting means, into corresponding address data having a speed value and a load value and for sending the address data to said first and second storages.

10. An ignition timing control apparatus for an internal combustion engine according to claim 9 wherein said interpolating operation means includes means for providing a proportional factor corresponding to the octane rating of said fuel based on knock occurrence rate indicated by said displacement magnitude determining means, an interpolator for performing an interpolating operation according to said proportional factor between the first and second ignition timing characteristics respectively stored in said first and second storages, and a subtractor for subtracting said output of said correction magnitude determining means from an output produced by said interpolator.

11. An ignition timing control apparatus for an internal combustion engine according to claim 9 wherein said interpolating operation means includes an adder for adding the output of said correction magnitude determining means and the output of said displacement magnitude determining means, means for providing a proportional factor corresponding to the octane rating of said fuel based on the output of said adder, an interpolator for performing an interpolating operation according to said proportional factor between the first and second ignition timing characteristics respectively stored in said first and second storages.

12. An ignition timing control apparatus for an internal combustion engine according to claim 9 wherein said displacement magnitude retaining means comprises a first digital comparator for comparing said load value of said address data from said ignition timing computing unit with a predetermined reference light load value to provide an output indicating a light load condition only when said load value of said address data is lower than said reference light load value, a differential computing unit for computing an actual acceleration value from said load value and said speed value of the address data from said ignition timing computing unit, a second digital comparator for comparing the computed acceleration value with a predetermined reference rapid acceleration value to provide an output indicating a rapid acceleration condition only when the computed acceleration value exceeds the reference rapid acceleration value, and an OR gate for combining the outputs of said first and second comparators for retaining said displacement magnitude.

* * * * *